United States Patent [19]

DeMeyer

[11] Patent Number: 4,637,546

[45] Date of Patent: Jan. 20, 1987

[54] PNEUMATIC DIFFERENTIAL PRESSURE CONTROLLER

[75] Inventor: Roy W. DeMeyer, Oconomowoc, Wis.

[73] Assignee: Johnson Service Company

[21] Appl. No.: 776,575

[22] Filed: Sep. 16, 1985

[51] Int. Cl.⁴ .............................................. F24F 7/00
[52] U.S. Cl. ......................................... 236/49; 236/87
[58] Field of Search ............................. 236/49, 87, 85

[56] References Cited

U.S. PATENT DOCUMENTS

| | | | |
|---|---|---|---|
| 3,806,027 | 4/1974 | Ginn et al. | 236/49 |
| 4,182,486 | 1/1980 | Mott | 236/49 |
| 4,467,956 | 8/1984 | Kreuter | 236/49 |

*Primary Examiner*—William E. Wayner
*Attorney, Agent, or Firm*—Joseph J. Jochman, Jr.; Larry L. Shupe

[57] ABSTRACT

A differential pressure controller includes means for controllably metering a flow of air therethrough to an external control device, the metering means including a valving member and a nozzle coacting with the member for metering the flow of air. Also included in a plurality of diaphragms coacting with the valving member and defining a first chamber for receiving a first pressure signal and a second chamber for receiving a second pressure signal. One of the pressure signals includes a component representative of a master control signal. Metering of the flow of air is in response to a pressure difference between the first pressure signal and the second pressure signal.

10 Claims, 6 Drawing Figures

PNEUMATIC DIFFERENTIAL PRESSURE CONTROLLER

BACKGROUND OF THE INVENTION

This invention relates generally to pneumatic pressure controllers and in particular, to a differential pressure controller for regulating the velocity of air flowing through a duct.

As is known, heating, ventilating and air conditioning (HVAC) systems are used to control, among other parameters, the temperature of a space to be conditioned. An example of such a space may be one or more rooms in an office building. In earlier systems, the manner of controlling temperature was to provide a thermostat within the space for establishing the setpoint or temperature to be maintained therein. If cooling was required to maintain this setpoint, as in summertime, the volume of air flowing through a duct and into the space was maintained at a constant value while the temperature of that air was regulated to provide the desired level of cooling. Since the duct air flow rate or velocity was essentially constant, the volume of air flowing therethrough was likewise substantially constant, the velocity and volume having a known relationship for a duct of a known cross-sectional area. These earlier systems were characterized by at least two disadvantages.

First, the velocity of air flowing through the duct tended to vary due, in part, to changes in the duct static pressure caused by adjustments in flow within other duct systems within the building. Second, the temperature of this air was frequently controlled by mixing warmer and cooler air and the energy consumed by that process was undesirably high and therefore wasteful.

In more recent HVAC systems, a variable air volume (VAV) scheme has been adapted. In a scheme of this type and if, for example, space heating was required as in a wintertime application, the temperature of the air flowing through the duct is maintained at a relatively constant value, within a range of, for example, 20°-40° above thermostat setpoint. The volume of air flowing through the duct is thereupon increased, maintained or decreased for maintaining the thermostat setpoint temperature, even though the space heating load may vary. Similarly, if cooling is required to maintain a temperature within a space, the duct air temperature will be maintained at a relatively constant value within a range of, for example, 15°-20° F. below the thermostat setpoint. Thermostats typically used with VAV systems are of the pneumatic type and provide a pressure output signal useful for control purposes.

Differential pressure controllers as embodied by the instant invention and as disclosed in U.S. Letters Patent discussed below therefore employ a parameter known as the velocity or kinetic pressure to effect control. Since velocity pressure is not readily, directly obtained within an air duct, it may be determined by sensing (a) the velocity+static pressure, sometimes termed the stagnation pressure, on one hand and (b) the lower static pressure on the other hand and subtracting the static pressure from the stagnation pressure to obtain the velocity pressure component. In the invention and in other known differential pressure controllers, the subtraction of these pressures is effectively resolved as a differential pressure across a sensing diaphragm.

One known way of obtaining the stagnation pressure component is by the disposition of a Pitot tube within the duct with the Pitot nozzle directed upstream parallel to the axis of air flow. The static pressure may be obtained by a static pressure tube disposed within the duct and having its axis oriented normal to or downstream of the air flow. Having thus obtained the velocity pressure, the air velocity may be computed using the known formula $$V = Cp \frac{\sqrt{Pv\, 2g}}{da}$$

where V=velocity in ft./min., Cp=the velocity coefficient, Pv=velocity pressure in inches water gauge, g=32.2 ft/sec$^2$ gravity and da=the air density in lbs./cu. ft. Thereafter, the volumetric rate of air flow through the duct may then be readily determined by the known formula $Q=V \times A$ where Q=air quantity in cu.ft./min. and A=the cross-sectional area of the duct in sq. ft.

The aforedescribed approach to VAV system control will be satisfactory so long as the static pressure in the duct remains unchanged. In practice, this static pressure is likely to change due to air flow protuberances as flow controlling dampers in other parts of the HVAC system are opened or closed. Therefore, a more desirable differential pressure control for use in VAV systems will be capable of being interlocked to and resettable or readjustable by the room thermostat. The control will thereby be capable of maintaining a constantly regulated volume of air into a space where the volume flow is in proportion to the requirement set by the thermostat and independent of variations of static pressure within the duct. It is also desirable that such a controller be adaptable to limit the maximum and minimum velocities of air flowing through the duct and is also capable of exhibiting satisfactory control characteristics near zero velocity settings. This latter function is made more difficult by the fact that, near zero velocity settings, small changes in duct static pressure and the resulting shift or offset in the setpoint of the controller will affect the velocity of air in the duct to a greater extent than would occur with the same change in static pressure at higher velocity settings.

Several considerations impact upon the design of a preferred differential pressure controller, one of them being related to the fact that such controllers may be used in any one of four, commonly encountered control modes, namely direct acting with direct or reverse readjustment and reverse acting with direct or reverse readjustment. These modes are described in further detail following. Therefore, a preferred controller will be readily connectable for use in any one of the four control modes without modification and without the necessity of employing a device commonly known as a reversing relay. A controller designed in this preferred manner may be manufactured and stocked by sellers in only a single configuration and, further, the sellers' inventory may be reduced if reverse relays are no longer required.

Yet another consideration relates to the fact that such controllers typically operate on extremely low pressures, typically on the order of under one inch water column, one inch water column pressure being approximately equivalent to 1/27th p.s.i.g. Therefore, it is important that such a controller be configured to eliminate or at least minimize friction between sliding components and be further configured to eliminate changes in performance characteristics due to wearing of the parts.

One approach to the design of such differential pressure controllers is shown in U.S. Pat. No. 4,077,567. Since the device shown therein provides for the application of a thermostat control signal component to a separate reset diaphragm and pressure chamber rather than to one of the main pressure chambers, it is useful only in the direct acting, direct readjustment mode. Additionally, the device shown therein employs a pinned, pivotable arm, the progressive wearing of which may result in loss of accuracy. It further employs a reset pin coacting with a leaf spring, the interface of which may result in unnecessary sliding friction as will the use of an arbor and a piston, both being slidable within bores. Further, that device is unnecessarily complex in its use of multiple piece parts.

Yet another apparatus for controlling the volume of flow within a duct is shown in U.S. Pat. No. 3,941,310. This apparatus is similar to the aforementioned in its use of a pivoted lever. Additionally, this apparatus uses only one sealing diaphragm and a device so constructed may be subject to undesirable drift with changes in duct static pressure because of unequal effective (net) areas at either side of the main sensing diaphragm.

A differential pressure controller which resolves velocity pressure and employs a pair of chambers, one of which senses a thermostat control signal component, which employs a coaxial force balance design to be readily reconnectable to any one of four control modes, which is made substantially frictionless by avoiding pivoted levers and pistons sliding within bores, which may be configured to eliminate controller offset otherwise resulting from changes in static pressure and which may be readily adapted to maintain the readjustment signal between preselected high and low limits would be a distinct advance in the art.

SUMMARY OF THE INVENTION

In general, a differential pressure controller for regulating the flow of air through a duct includes a housing with a diaphragm stack disposed therein. The stack includes a resilient sensing diaphragm movable in response to a differential pressure thereacross. The controller also includes a leakport for flowing air to an external control device and a valving seat coupled to the sensing diaphragm and movable therewith along an axis of movement. The valving seat coacts with the leakport for controlling the flow of air to the external device.

A first spring is disposed coaxially with this axis of movement and exerts a force upon the valving seat in a direction to close the leakport while a second spring is disposed coaxially to the axis of movement and exerts a force upon the valve seat in a direction to open the leakport. The controller is devoid of sliding pistons and may be connected for operation in any one of four or more control modes without modification.

It is an object of the present invention to provide a differential pressure controller which overcomes the disadvantages of earlier devices.

Another object of the present invention is to provide a differential controller which utilizes a force balance scheme for controlling the position of a valving seat with respect to its associated leakport.

Yet another object of the present invention is to provide a differential pressure controller which may be readily adapted to provide direct acting or reverse acting control schemes while yet avoiding modification of the device.

Still another object of the present invention is to provide a differential pressure controller which may be employed as a submaster controller to a pneumatic thermostat.

Another object of the present invention is to provide a controller which may be configured to eliminate pressure offset resulting from changes in duct static pressure.

Still another object of the invention is to provide a controller having a pair of pressure chambers to result in a differential pressure across a sensing diaphragm and is constructed so that a thermostat control signal component may be directed to either of the chambers, depending in part upon the control mode being employed.

Yet another object of the present invention is to provide a controller which may be connected to establish high and low limit pressures to define a span of thermostat readjustment pressures for controlling the maximum and minimum flow rates of air through a duct. How these and other objects of the invention may be accomplished will become more apparent after appreciating the drawing and the detailed description following.

DESCRIPTION OF THE PREFERRED EMBODIMENTS

Figure 1:
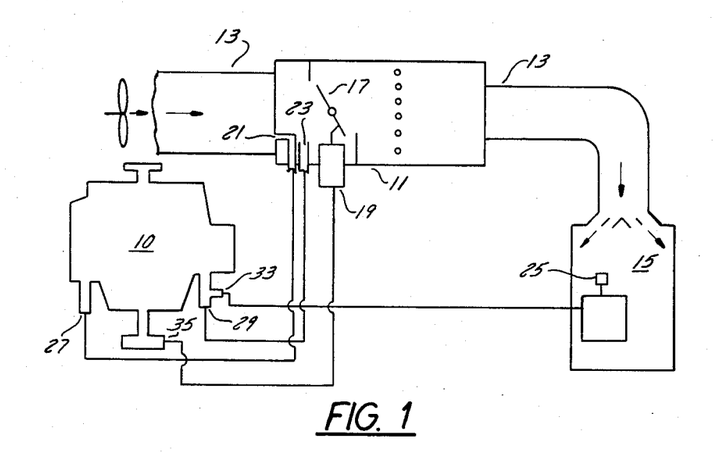
FIG. 1 is a representative cross-sectional side elevation view of a variable air volume distribution system which incorporates the differential pressure controller constructed in accordance with one embodiment of the present invention.

Referring first to FIG. 1, the inventive controller 10 is shown in connection with a VAV control box 11 and associated duct work 13 for controlling the volumetric flow of air into a space 15, the temperature of which is to be regulated. Included within the control box 11 is a damper 17 which may be positioned between fully open and fully closed. Damper positioning is typically by a spring-biased pneumatic cylinder 19 and it is to be appreciated that the damper 17 and cylinder 19 combination may be arranged to define any one of four operative combinations. These combinations are (a) spring biased open with increasing pressure required for closure (b) pneumatically biased open, with decreasing pressure required for spring closure (c) spring biased closed with increasing pressure required to open and (d) pneumatically biased closed with decreasing pressure required to open under spring force. The requirements of these four conditions are readily met by the inventive controller 10.

Also included within the box 11 is a first tube 21 for sensing the stagnation pressure therein and a second tube 23 for sensing the box static pressure. In the alternative, a known Pitot tube may be substituted for the tubes 21, 23, since the former is embodied as a unitary structure built in a manner to sense both stagnation and static pressure. A thermostat 25 is disposed in the space 15 for generating a pressure signal, sometimes termed the master control signal, representative of the velocity flow to be maintained. Commonly employed pneumatic thermostats operate between predetermined presures as, for example, between 8-13 pounds per square inch gauge (p.s.i.g.) to control the damper 17 over its range of travel between open and closed positions. In this example, 8 p.s.i.g. is sometimes termed the starting readjustment point while 13 p.s.i.g. is sometimes termed the final readjustment point. For example, if a summertime cooling function is being controlled and the thermostat 25 is emitting a setpoint control signal of 9 p.s.i.g. and if the space heat load is such that additional cooling air flow is required to maintain a temperature, the thermostat 25 is said to be of the direct readjustment type if its output control signal increases to, say, 10 p.s.i.g. to cause such additional cooling. Similarly, if the output signal is made to increase to cause reduced air flow from the VAV box 11, the thermostat 25 is said to be of the reverse readjustment type and this control mode is frequently used on heating applications.

Figure 2:
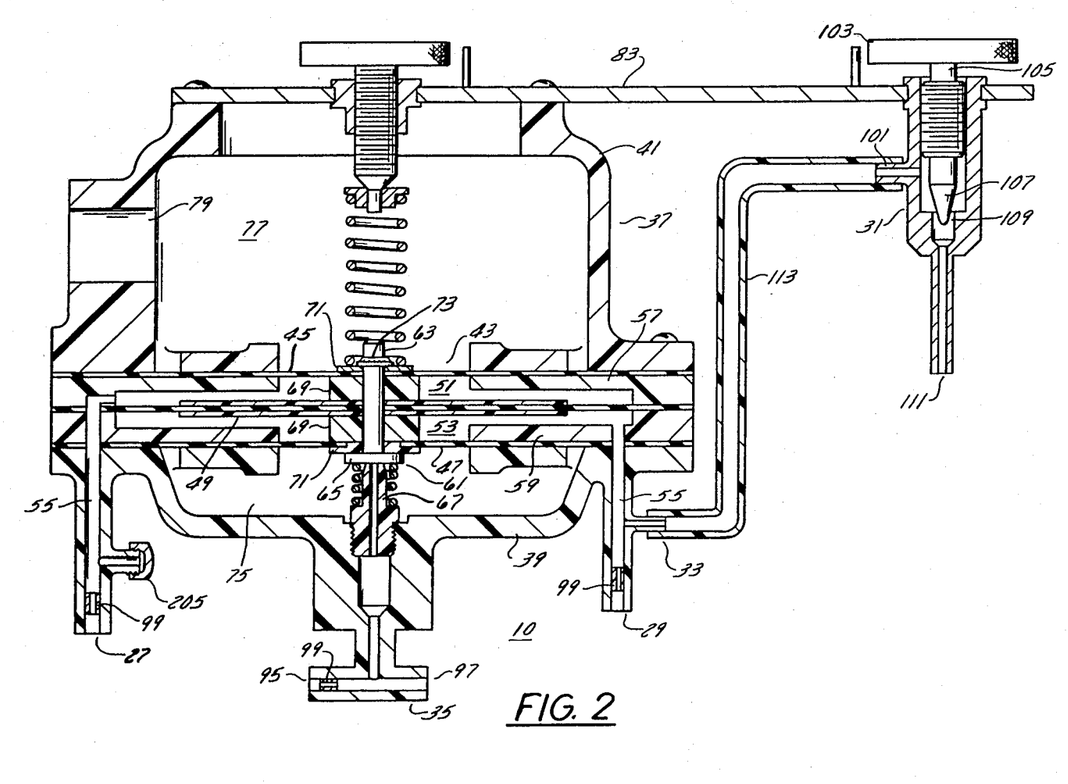
FIG. 2 is a side elevation view of a simplified first embodiment of the inventive controller with portions shown in cross section and others shown in full representation.

Referring additionally to FIG. 2 and continuing to assume that a summertime cooling function is being controlled, the signal from the first tube 21 is directed to a first port 27 of the controller 10 while that of the second tube 23 is directed to the second port 29 of the controller 10. The reset or readjustment pressure signal emanating from the thermostat 25 is directed through a pin valve 31 and thence to a third port 33 while the output signal for controlling the position of the cylinder 19 emanates from the control port 35 of the controller 10. It will be further assumed that the cooperative arrangement of the damper 17 and its positioning cylinder 19 are such that the cylinder spring biases the damper 17 open and increasing cylinder pressure is required to move the damper 17 toward a closed position.

When the illustrated circuit is used with combination (c) described above and when the thermostat 25 emits a pressure signal which increases with a requirement for increased cooling air flow, the system is said to be arranged in the direct acting direct readjustment mode. One will readily appreciate how the controller 10 may be used in systems of direct acting reverse readjustment, reverse acting direct readjustment and reverse acting reverse readjustment modes after appreciating the teachings of the specification.

More particularly, the controller 10 is shown to include a housing 37 which is preferably generally circular in shape and has a lower wall member 39, an upper wall member 41 and a diaphragm stack 43 disposed therebetween. The diaphragm stack 43 includes an upper seal diaphragm 45, a lower seal diaphragm 47 and an intermediate sensing diaphragm 49. The diaphragms 45 and 49 define a first chamber 51 for sensing the pressure at the first port 27 while the diaphragms 47 and 49 define a second chamber 53 for sensing the pressure at the second port 29. Pressure transmitting communication between the ports 27, 29 and the chambers 51, 53 respectively is by channels 55 formed within the ports 27, 29 and within a first annular ring 57 and a second annular ring 59 disposed respectively between the upper and sensing diaphragms 45 and 49 respectively, and between the lower and sensing diaphragms 47 and 49 respectively. A generally T-shaped valving member 61 is disposed at the center of the diaphragms 45, 47, 49 and includes an elongate, upwardly extending generally cylindrical stem 63 and a lower disc-shaped seat 65, the latter for coacting with a leakport 67. Rigid, annular upper and lower spacing discs 69 are disposed coaxially with the stem 63 for providing a gas-flow tight seal between the chambers 51, 53 and the stem 63, for aiding in maintaining the diaphragms 45, 47, 49 in a predetermined spaced relationship and for supporting the seat 65. A pair of annular disc-shaped backing plates 71 are disposed one each intermediate the seat and the lower diaphragm 47 and intermediate the upper diaphragm 45 and a speednut fastener 73. This assembly assures sealing of the chambers 51, 53, maintains the plates 71, the discs 69 and the diaphragms 45, 47, 49 in sequential stacked contact one with the other and prevents movement of the seat 65 with respect to the stack 43.

It will be apparent from the foregoing description that if the pressure in the first chamber 51 is slightly in excess of that in the second chamber 53, the differential pressure and resulting differential force across the sensing diaphragm 49 will result in a force tending to urge the valve seat 65 toward the leakport 67, vertically downwardly as viewed in FIG. 2. This will cause the pressure at the control port 35 to increase until a new equilibrium is reached and the set point differential pressure is restored. Similarly, if the pressure in the second chamber 53 exceeds that of the first chamber 51, the resulting differential force will tend to move the valve seat 65 vertically upwardly and away from the leakport 67. Since the cavity 75 in the lower wall member 39 is vented to atmosphere by an aperture (not shown), this will cause the pressure at the control port 35 and cylinder 19 to decrease until equilibrium is reached and no differential force on the diaphragm 49 exists. For proper operation of the controller 10, it is preferred that the space 77 lying above the diaphragm 45 and generally enclosed by the upper wall member 41 also be vented to atmosphere and an aperture 79 is provided for the purpose.

Figure 3:
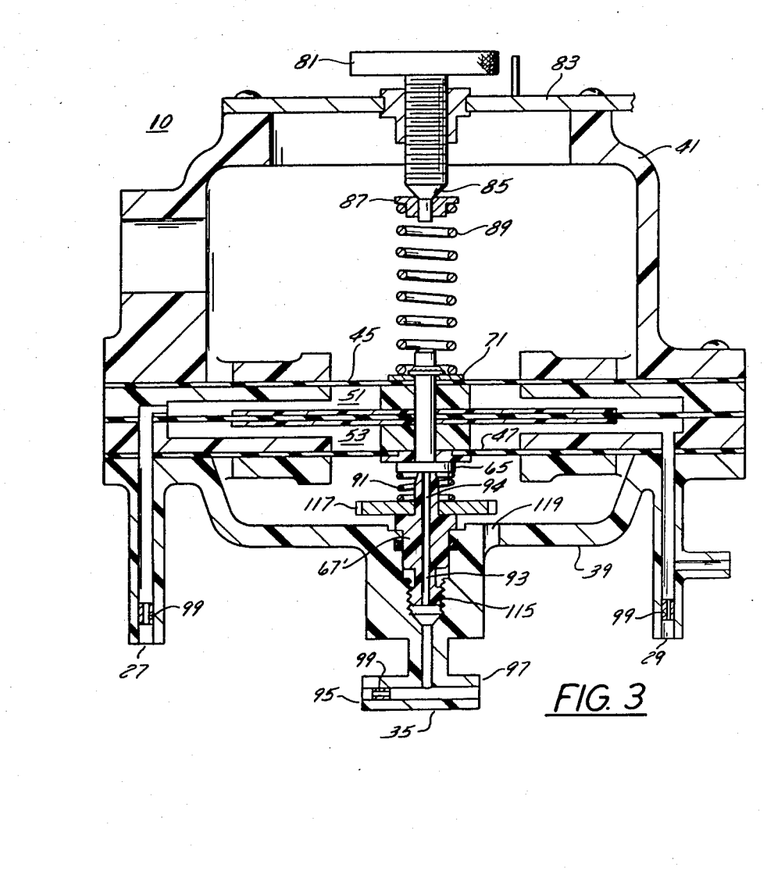
FIG. 3 is a side elevation view of a simplified second embodiment of the inventive controller which incorporates a modification to eliminate offset otherwise resulting from static pressure changes, with portions shown in cross section and others shown in full representation.

Referring additionally to FIG. 3, for the purpose of adjustment of the controller setpoint, i.e., that pressure to be maintained in the cylinder 19 for a particular thermostat starting readjustment point, it is preferred that the controller 10 also include a threaded adjustment screw 81 received within the top cover 83 and having affixed to the nose 85 thereof a bushing 87 for retaining a first reaction member 89 between the bushing 87 and the plate 71 and in a location which is coaxial along a vertical axis for exerting a first force directly coaxially upon the valve seat 65. A second reaction member 91 is similarly confined between the seat 65 and the leakport 67. Reaction members 89, 91 may be embodied as coiled compression springs.

A preferred leakport 67' is embodied to have a flow passage 93 therethrough and a nozzle 94 defining a truncated cone and with which the seat 65 coacts for controlling the pressure within the external control device, e.g., the pneumatic cylinder 19. Motive power for the cylinder 19 is supplied by a source (not shown) of compressed air at a constant pressure, typically 20 p.s.i.g. This source is preferably equipped with a flow restricting orifice 99 and is connected to a first leg 95 of the control port 35, the second leg 97 being connected to the cylinder 19. Restrictor control orifices 99 are also used in the ports 27, 29 in a known manner for restricting the flow of air therethrough and it is to be appreciated that the orifice 99 of the leg 95 is preferably selected so that it represents a greater restriction to gas flow than does the leakport 67' when the latter is open.

While the pneumatic thermostat 25 provides an output signal having a value of a few p.s.i.g., typically 3–15 p.s.i.g., a preferred controller 10 is required to function at much lower pressures in the range of the stagnation and static pressures, i.e., from zero to about one inch of water column. Therefore, it is preferred that some sort of pressure reducing device be employed to provide this reduction. Accordingly, and as shown in FIG. 2, the controller 10 may also include a pin valve 31 and a flow restrictor 101 for adjusting the magnitude of the thermostat control component readjustment signal which is directed to the third port 33. The pin valve 31 includes an adjustment dial 103, a stem 105 threadably received into the cover 83 and a point 107 which coacts with a circular seat 109 for controllably restricting the flow of air therethrough. When used in this embodiment, the thermostat readjustment signal is directed to the pin valve inlet 111, the valve restrictor 101 being connected to the leg 33 by a pneumatic conductor 113.

Referring further to FIGS. 1 and 3, it will be recalled that the signal from the first tube 21 applied to the first port 27 includes a velocity pressure component and a static pressure component while the signal applied to the second port 29 from the second tube 23 consists of only the static pressure component. Therefore, when the static pressure of the upstream portion of the duct 13 varies, as may be caused by protuberances elsewhere in the system, this variance will be reflected in the pressure prevailing in both the first and second chambers 51, 53. It is also known that while the physical areas of the upper and lower diaphragms 45, 47 have been configured to be substantially identical one to the other, in most circumstances there is a slight difference in the effective area of the upper diaphragm 49 with respect to the lower diaphragm 47, either higher or lower. When subjected to changes in static pressure, these slight differences in area will cause a corresponding slight change in the position of the diaphragm stack 43 and therefore of the valve seat 65 with respect to the leakport 67'. This phenomenon is particularly undesirable at low rates of flow through the duct 13. However, there is a stable position of substantially equivalent effective area which may be achieved by the stack 43 and which will be at a position slightly shifted upwardly or downwardly from the essentially horizontal maximum area position. Therefore, if the leakport 67' may be adjustable to this position of equal diaphragm effective area, the phenomenon of undesirable controller offset due to static pressure changes in the duct may be essentially eliminated.

The leakport 67' may be installed in the lower wall member 39 by a threaded shoulder 115. A spur gear 117 may be formed on the leakport 67' and an access hole 119 formed in the lower wall 39 to permit the insertion of a geared hand tool for rotatably positioning the leakport 67' upwardly or downwardly.

Figure 4:
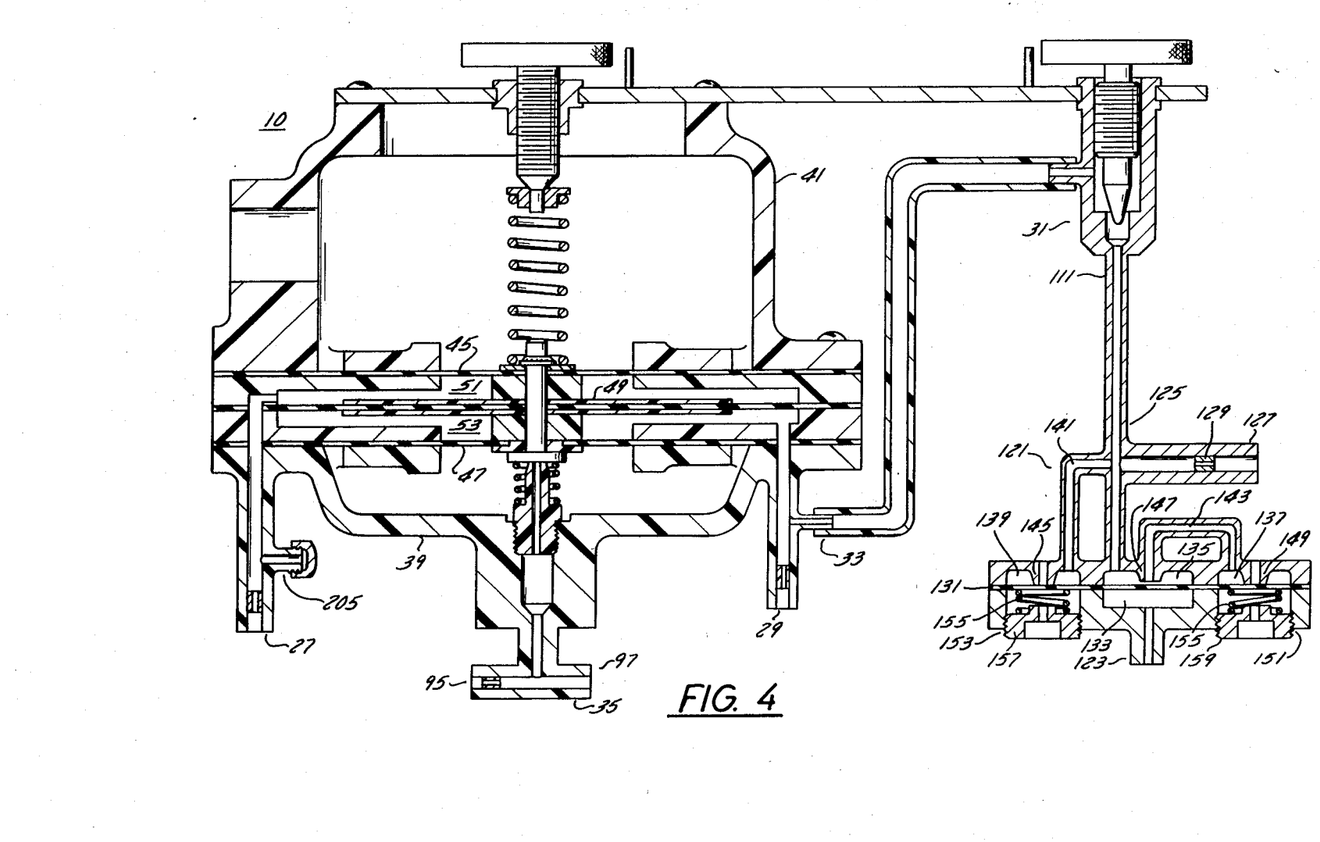
FIG. 4 is a side elevation view of a pressure limiter useful with the embodiments for limiting the thermostat readjustment signal between high and low pressure limits, with portions shown in cross section and others shown in full representation.

Referring next to FIGS. 1 and 4, and in yet another embodiment, the controller 10 may also include means 121 for setting a high limit flow velocity and a low limit flow velocity to define a readjustment range, i.e., a span of control points or air flow controlling positions over which the cylinder 19 and attached damper 17 will be operatively controlled. This capability is useful if it is desired to prevent the damper 17 from fully closing, thereby maintaining some minimum volume of air flowing to the space 15, or from fully opening, thereby limiting the maximum volume of air flow. A preferred setting means 121 is embodied as a pneumatic signal limiter which has an input port 123 for receiving the thermostat readjustment signal and an output port 125 for providing a control pressure to the pin valve 31 at its inlet 111. The setting means 121 also includes a supply port 127 with a restrictor 129, the port 127 being coupled to a restrictor-equipped source of air (not shown) at a substantially constant pressure, typically 20 p.s.i.g. The setting means 121 also includes a resilient diaphragm 131 which divides the means 121 to a lower input chamber 133, an upper sensing chamber 135, a low limit chamber 137 and a high limit chamber 139. The sensing chamber 135 is in fluid flow communication with the chamber 139 and depending upon the position of the diaphragm 131, also with the chamber 137 by passages 141 and 143 respectively. The setting means 121 also includes, in the illustrated embodiment, three control nozzles 145, 147, 149 which coact with the diaphragm 131 for controlling the flow of air through the nozzles 145, 147, 149. The low limit section 151 and the high limit section 153 each include a coiled spring 155 maintained in compression by the diaphragm 131 and by threaded adjustment plugs 159 and 157, respectively. Rotation of the plugs 157 and 159 will permit control of that pressure in the chambers 139 and 137 respectively at which the diaphragm 131 will be caused to space slightly from the nozzles 145 and 149 respectively, to permit air to flow therethrough and out to atmosphere. In an exemplary manner of use, the position of the low limit plug 159 would be set to permit the spring 155 of section 151 to urge the diaphragm 131 to a position to meter nozzle 149 when the pressure in the chamber 137 is below 8 p.s.i.g. Similarly, the high limit plug 157 would be adjusted to permit the diaphragm 131 to move away from the nozzle 145 when the pressure in the chamber 139 exceeds 13 p.s.i.g. When the thermostat readjustment signal applied at the port 123 is between 8 p.s.i.g. and 13 p.s.i.g., the nozzles 147, 149 are open, the nozzle 145 is closed and the output signal from the port 125 is equal to the input signal from the thermostat 25 applied at port 123. This latter is so since the diaphragm effective areas within the input chamber 133 and the sensing chamber 135 are equivalent, any tendency of the pressure in the sensing chamber 135 to rise above that in the input chamber 133 being prevented by air flowing through the nozzles 147, 149 to atmosphere.

Figure 5:
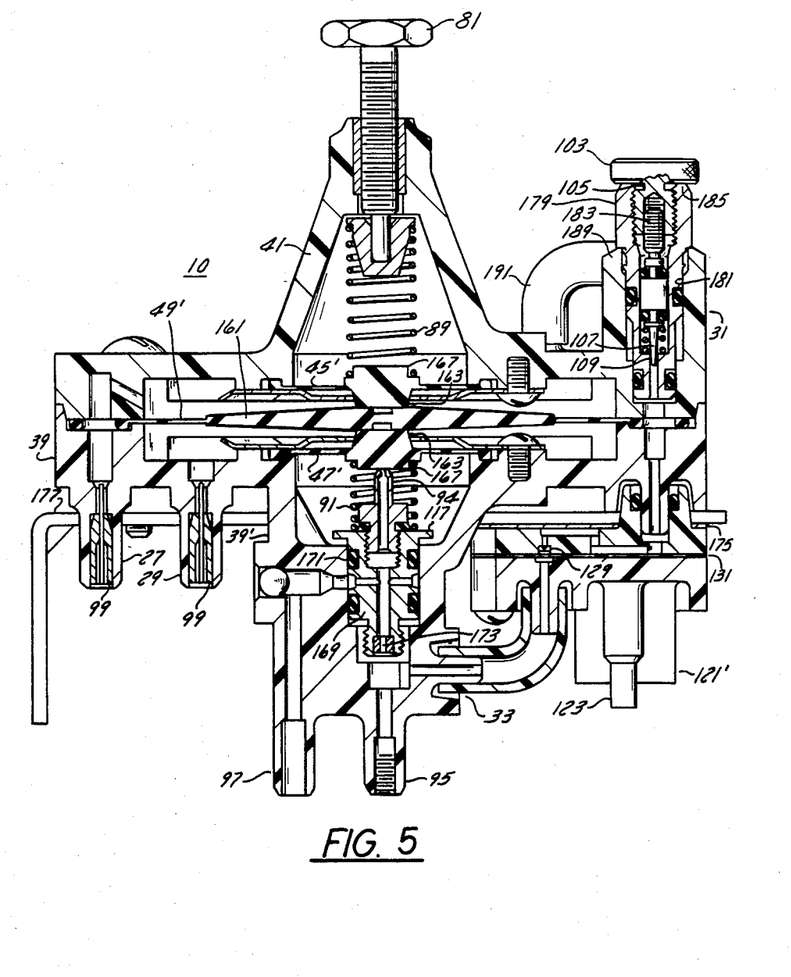
FIG. 5 is a side elevation view of a commercial embodiment of the present invention with portions shown in cross section and others shown in full representation.

In FIG. 5 depicting a preferred commercial embodiment, the sensing diaphragm 49' is preferably molded as a unitary structure having raised portions 161 for reducing flexure or a tendency to wrinkle at the central diaphragm region and central reliefs 163. The seal diaphragms 45', 47' are likewise preferably molded as unitary structures, function to limit the travel of the sensing diaphragm 49' and include a shoulder 167 for engaging the reaction members 89, 91. The nose member 167 of the diaphragm 47' also coacts with the nozzle 94 for controllably metering air therethrough. The nozzle 94 is threadably received in a plug member 169 which is inserted to a cavity in the lower wall member 39' and sealed by O-rings 171 and the wall member 39' and spur gear 117 are preferably cooperatively formed as described so that the latter is accessible from the exterior, thereby permitting small adjustments in the position of the nozzle 94. A restrictor 173 is provided within the member 39' for restricting the supply air flowing to the nozzle 94. The setting means 121' is conveniently formed as an integral part of the controller 10 and has its restrictor 129 inserted therewithin. A gasket 175 is used for effecting sealing between the setting means 121' and a mounting bracket 177 to which the controller 10 is affixed.

The pin valve 31 includes an integral point 107 which, by turning dial 103, is movable within a seat 109 or for regulating the pressure drop across the pin valve 31. The pin valve 31 and the stem 105 are conveniently received within a barbed metal insert plug 179 which itself is received within a cavity 181 molded in the member 41. The use of such a metal plug 179 provides greater dimensional stability in the event of changes in ambient temperature. The stem 105 includes an internal adjusting screw 183 for setting the minimum opening between the point 107 and seat 109 at that position at which the adjusting dial 103 is tightened to snugly engage the shoulder 185. This provision for setting a minimum gap between the point 107 and its seat 109 is preferred because of the very shallow taper of the point 107 and of the fact that it may otherwise be readily caused to be wedged in the seat 109 if permitted to come in contact therewith.

The members 39, 41 may be conveniently injection molded of plastic while restrictors 99 may be of the capillary type which include an inserted rubber plug with a capillary needle pressed therethrough. The connecting tube 187 which has its first end 189 attached to the downstream side of the pin valve 31, may have its second end 191 attachable to the upper chamber spigot as shown or, in the alternative, to a lower chamber spigot (not shown). A flow passage (not shown) is provided to permit the flow of air from the downstream side of the pin valve 31 to the upper chamber spigot or to the lower chamber spigot. Since the embodiment of FIG. 5 avoids the use of a stem 63 as shown in FIG. 2, the attendant possibilities of stem misalignment and air leakage between the stem 63 and the diaphragms 45', 47', 49' are likewise avoided.

Referring to FIGS. 1, 4, 5 and 6, an understanding of how the adjustable pin valve 31 and the setting means 121, 121' may be used for system adjustment will be aided by understanding that, in VAV systems, the setting means 121' may be incorporated as part of the controller 10 as in FIG. 5 or, in the alternative, may be constructed as part of the room thermostat 25 (FIG. 1). Additionally, it is to be appreciated that commonly available VAV control boxes such as box 11 are sized so that rated or 100% air flow therethrough will be attended by a box pressure drop of 1.0" water gauge. Using the aforementioned air velocity formula, it may therefore be computed that the percent flow through the box 11 at a pressure drop of 0.1" water gauge thereacross is 31.6% of rated flow, as an example.

Figure 6:
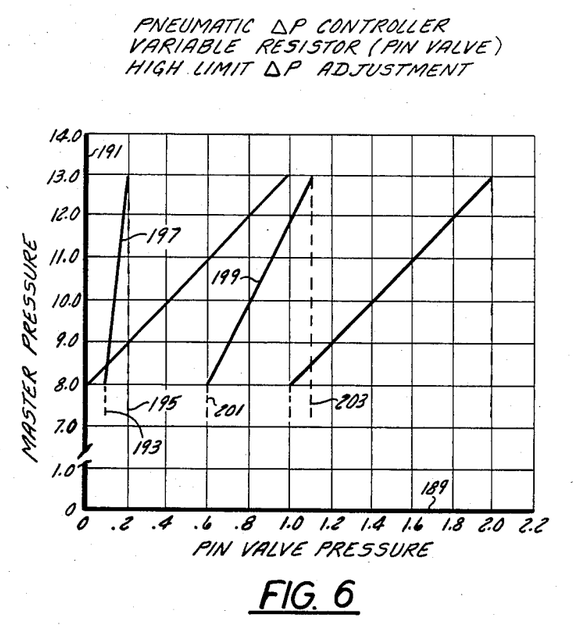
FIG. 6 is a graphical depiction of the control function resulting from the adjustment of portions of the inventive controller.

Referring particularly to FIG. 6, the horizontal axis 189 is scaled to depict the output pressure of the pin valve 31 to the controller 10 in inches water gauge while the vertical axis 191 is scaled to depict the output pressure from the thermostat 25 or setting means 121, 121' in p.s.i.g. For this explanation, it will be assumed that the range of control over which the VAV box 11 may be caused to operate will occur within the range of 8–13 p.s.i.g. The selection of 8.0 p.s.i.g. as the starting point is performed by manipulation of the dial 81 while selection of the 13 p.s.i.g. upper limit is by manipulation of plug 157 of the high limit section 153. The span of box pressure drop over which the damper 17 will move between the full closed and full open position is determined by the setting of the pin valve 31. If the pin valve 31 is adjusted to be very slightly open, it will be seen that when the output pressure from the thermostat 25 or the setting means 121, 121' is 8.0 p.s.i.g., the box 11 commences control and when that output pressure is 13.0 p.s.i.g., the box 11 no longer exhibits any additional air flow controlling movement. As reflected by the difference between point 193 and point 195 as measured along the horizontal axis, this change in control capability has occurred over a span of 0.1" water gauge as represented by line 197. If the pin valve 31 is adjusted to an intermediate position, the resulting function is represented by line 199 wherein an output pressure of 8.0 p.s.i.g. is accompanied by a pressure at the point 201 of 0.6". Similarly, an output pressure of 13.0 p.s.i.g. is accompanied by a pressure at the point 203 of 1.1", the difference in these two pressures being 0.5". It is therefore apparent that adjustment of the pin valve 31 will control the slope of a family of lines which includes lines 197, 199 while the setting of the adjustment dial 81 will control the starting point.

Referring to the FIGURES and in operation, it is first assumed that the damper-cylinder combination 17, 19 is of a type wherein the damper 17 would be spring biased to a fully open position, increasing cylinder pressure being required to move the damper 17 toward a closed position. Additionally, the first tube 21 is connected to the first port 27, the second tube 23 is connected to the second port 29 and the auxiliary leg 205 of the first port 27 is capped to prevent leakage. It is further assumed that the environmental conditions are such that cooling is required to maintain the space 15 at a temperature and that the thermostat 25 used therein is of the direct action type, i.e., it will provide an increasing output pressure signal with increases in cooling requirements. It is further assumed that the system is in a steady state condition, the system is connected as shown in FIGS. 1 and 2 or 5 and that the damper 17 is positioned in an intermediate location by a 10 p.s.i.g. signal applied to the cylinder 19. This signal, the output signal of the control port 35, results from a particular volume of air flow and therefore velocity pressure within the box 11. The temperature of the cooling air within the duct 13 is maintained at approximately 15°–20° F. below the thermostat setpoint, i.e., the pressure signal representing that temperature which is desired to be maintained in the space 15.

With the onset of human occupancy and/or advancing summertime daylight hours, either or both of which may cause the heat load and resulting temperature in the space 15 to increase, the thermostat 25 will generate a higher pressure signal. When a representation of this signal is applied to the port 33 from the pin valve 31, this will result in an increase in the pressure in the second chamber 53. This causes the seat 65 to move slightly away from the nozzle 95 which functions to reduce the pressure at the control port 35. This, in turn, permits its internal spring to bias the cylinder 19 to a new position to incrementally move the damper 17 in the opening direction. A higher volume flow rate thereupon occurs in the duct 13 with a resultant increase in the stagnation pressure applied to the first chamber 51. This pressure increase urges the seat 65 back to a pressure controlling relationship with the nozzle 94 and a new control port pressure balance point of, e.g., 9 p.s.i.g. The controller 10 then comes again to equilibrium but at a higher setpoint, i.e., higher volume flow rate in the duct 13.

If the arrangement of the damper 17 is maintained such that it is spring biased open by the cylinder 19 but the selected thermostat 25 is of the reverse action type, the representation of this readjustment signal, as from the pin valve 31, is connected to the leg 205 of the first port 27, the third port 33 is capped and other pressure connections remain unchanged. Other ways of connecting the controller 10 for reverse acting direct readjustment and reverse acting reverse readjustment will be apparent to those of even rudimentary skill in the art. It should be appreciated that the range of pressures over which the thermostat 25 will readjust the controller 10 and the range over which the cylinder 19 will fully displace the damper 17 may but need not necessarily be coincident.

While only a few preferred embodiments of the inventive controller 10 have been shown and described herein, it is not intended to be limited thereby but only by the scope of the claims which follow.

I claim:

1. A differential pressure controller for regulating the flow of air through a duct and including:
   a housing;
   a diaphragm stack disposed in said housing and including a pair of seal diaphragms and a sensing diaphragm disposed intermediate said seal diaphragms, said sensing diaphragm and said seal diaphragms defining a pair of pressure chambers, said sensing diaphragm being movable in response to the difference in pressures prevailing in said chambers, the pressure in one chamber including a component representative of a thermostat control signal;
   a leakport for flowing air to an external control device;
   a valving seat coupled to said sensing diaphragm, and movable therewith along an axis of movement, said valving seat coacting with said leakport for controlling the flow of air to said external device;
   a first spring disposed coaxially with said axis of movement and exerting a force upon said valving member in a direction to close said leakport;
   a second spring disposed coaxially with said axis of movement and exerting a force upon said valving seat in a direction to open said leakport, said springs permitting the adjustment of the setpoint of said controller.

2. The invention set forth in claim 1 wherein the pressure prevailing in said one chamber further includes a pressure component representative of the static pressure in said duct.

3. The invention set forth in claim 2 wherein said controller further includes an adjustable range valve for providing said component representative of a thermostat control signal.

4. A control apparatus for regulating the volume of air flow through a duct and including:
   a housing;
   a plurality of diaphragms supported by said housing and including an upper seal diaphragm, a lower seal diaphragm and a sensing diaphragm disposed intermediate said seal diaphragms, said upper seal diaphragm and said sensing diaphragm defining a first chamber, said lower seal diaphragm and said sensing diaphragm defining a second chamber, said sensing diaphragm being movable in response to the differential pressure of said chambers;
   a leakport for flowing air to an external control device;
   a nose member coincidently movable with said sensing diaphragm, the movement of said nose member being along an axis, said nose member coacting with said leakport for controlling the flow of air to said external device;
   a first spring disposed coaxially with said axis and exerting a force in a direction to close said leakport, and;
   a second spring disposed coaxially with said axis and exerting a force in a direction to open said leakport;
   an adjustable range valve for directing a signal component representative of a master control signal to one of said chambers;
   said apparatus being connectable to a variable air volume control box for sensing the box stagnation pressure and static pressure and controlling the volume of air flow through said duct in response to said stagnation pressure, said static pressure and said signal component.

5. The invention set forth in claim 4 wherein the pressure in said first chamber is representative of said stagnation pressure and the pressure in said second chamber is representative of the sum of said static pressure and said signal component.

6. The invention set forth in claim 4 wherein the pressure in said first chamber is representative of the sum of said static pressure and said signal component and the pressure in said second chamber is representative of said stagnation pressure.

7. The invention set forth in claim 4 wherein said apparatus is reconnectable to direct a pressure representative of said stagnation pressure to either of said chambers and to direct a pressure representative of the sum of said static pressure and said signal component to the other of said chambers while avoiding modification of said apparatus.

8. The invention set forth in claim 4 and further including a pneumatic signal limiter for controlling the maximum and minimum rates of flow of air through said duct, said limiter including a first port connectable to a thermostat for receiving a readjustment pressure signal therefrom and a second port connectable to said range valve for providing a span of pneumatic pressure thereto, said span being the difference between a high limit pressure and a low limit pressure.

9. The invention set forth in claim 8 wherein said pressure signal of said range valve is directed to said first chamber.

10. The invention set forth in claim 8 wherein said pressure signal of said range valve is directed to said second chamber.

* * * * *